Aug. 6, 1940.  J. C. FITZGERALD  2,210,807
TELLTALE
Filed Sept. 9, 1938
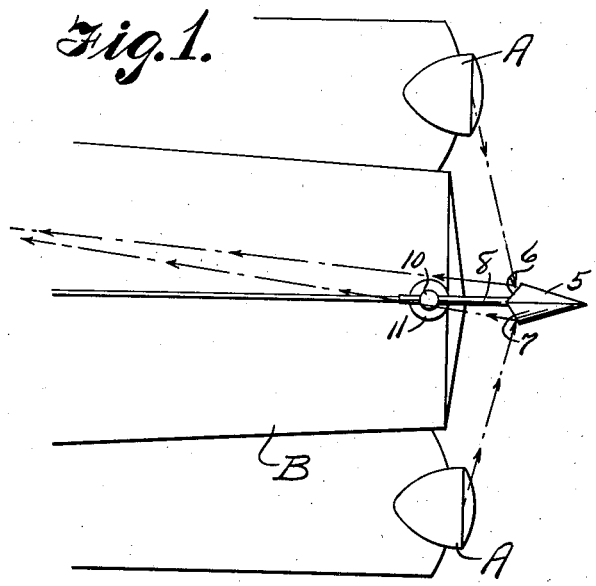
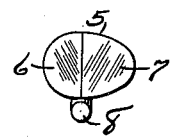
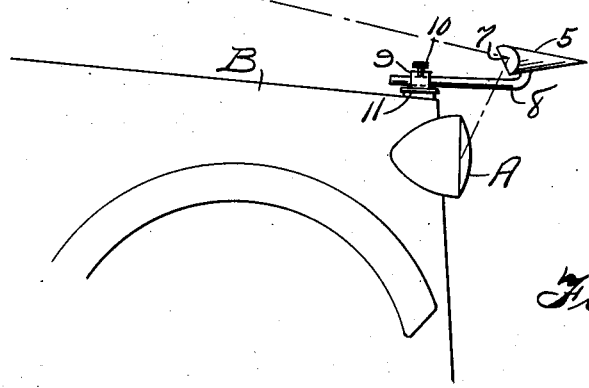
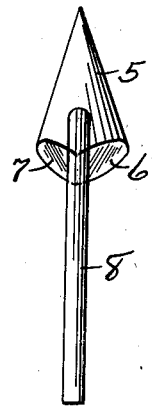
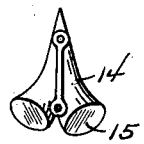
John C. Fitzgerald
INVENTOR
BY Victor J. Evans & Co.
ATTORNEYS Patented Aug. 6, 1940

2,210,807

UNITED STATES PATENT OFFICE 2,210,807

TELLTALE

John C. Fitzgerald, Pittsburgh, Pa.

Application September 9, 1938, Serial No. 229,202

3 Claims. (Cl. 88—81)

The invention relates to a headlight mirror for automobiles and more especially to a telltale mirror for automobile headlights.

One of the principal objects of my invention is to provide a telltale adapted to be mounted on the front of a motor vehicle and in confronting relation with the headlights and which is equipped with means for intercepting light rays from the headlights and reflecting the same to the eyes of the operator of the vehicle whereby said operator may readily discern whether the headlights are in lighted condition and also whether the condition be dim, bright or otherwise, said means being so constructed as to preclude cross reflection of the rays reflected therefrom.

Another object of the invention is the provision of a device of this character, wherein the same is adapted to be held in a fixed position with relation to the twin headlights of a motor vehicle so that the reflection of the light therefrom is discernible to a driver of the motor vehicle and in this way enabling such driver to aascertain the character of illumination issued from the headlight, the device being neat in appearance and in no way detracting from the neatness of the vehicle under its customary equipment.

A further object of the invention is the provision of a device of this character, which is simple in its construction, thoroughly reliable and efficient in operation, easy of application to a motor vehicle, assuring proper observation of illumination from the headlights of a vehicle by a driver when within said vehicle and inexpensive to manufacture and install.

With these and other objects in view, the invention consists in the features of construction, combination and arrangement of parts as will be hereinafter more fully described, illustrated in the accompanying drawing, which discloses the preferred and a modified form of embodiment of the invention and pointed out in the claims hereunto appended.

In the accompanying drawing:

Figure 1 is a fragmentary plan view showing the device constructed in accordance with the invention applied to a motor vehicle for the reflection of the light from the headlights of such vehicle to a driver thereof.

Figure 2 is a fragmentary side elevation.

Figure 3 is an elevation of the device removed from the vehicle.

Figure 4 is a bottom plan view.

Figure 5 is a bottom plan view of a modified form of telltale.

Similar reference characters indicate corresponding parts throughout the several views in the drawing.

Referring to the drawing in detail, A designates generally a pair of twin headlights or lamps for a motor vehicle, a portion of the vehicle being indicated at B, while the mirror constituting the present invention will be hereinafter fully described.

The mirror comprises, in this instance, a stream-lined body 5 made from any suitable material and in its stream-lined formation tapers in a forward direction while at the rear of this body are the polished or mirrored surfaces 6 and 7, respectively, these being properly angled with relation to each other and the longitudinal axis of the said body so that when the body 5 is positioned fore of the motor vehicle the light issuing from the headlights or lamps A will be reflected on these surfaces 6 and 7 and the driver occupying the driver's seat within the vehicle can ascertain the condition of the lights or illumination showing very conclusively whether they are dim, bright or otherwise and also when one light is on and the other is off.

The body is formed with an arm 8 which is centered and aligned with the longitudinal axis of the body, being susceptible of fitting within a clamping eye 9 carrying a set screw 10 and this eye is preferably built upon a cap 11 for the filling spout of the radiator as equipped in motor vehicles. By the set screw 10, the body 5 can be adjusted at the option of the user of the mirror.

In Figure 5 of the drawing there is illustrated a modification wherein the body is fashioned with a conical front section 14 and a multifaced base section 15 defining a pair of spaced and forwardly divergent reflective areas or faces disposed one on each side of the axis of the conical front section. The faces or reflective areas are adapted to be disposed in a sidewise and confronting relation with the headlights in the same manner as the reflective faces of the preferred embodiment.

What is claimed is:

1. In combination, a motor vehicle having a pair of spaced headlights, and a telltale comprising a substantially conical body, means connecting said body to the front of said vehicle and forwardly of said headlights, said body having its axis disposed in a substantially horizontal, superjacent and interjacent position with respect to said headlights and with its base disposed in frontal relation with said headlights, said base being of a cuneiform configuration in plan and defining a pair of forwardly divergent reflective faces disposed one on each side of said axis and in sidewise and confronting relation with said headlights whereby to intercept light rays from said headlights and reflect the same to the eyes of the operator of said vehicle.

2. In combination, a motor vehicle having a pair of spaced headlights, and a telltale comprising a substantially oblique-conical body, a bracket secured at one end to the front of said vehicle and extending forwardly therefrom, said body being attached to the forward end of the bracket and having its axis disposed in a substantially horizontal, superjacent and interjacent position with respect to said headlights and with its base disposed in frontal relation with said headlights, said base formed with a pair of forwardly divergent plane reflective faces and with each of said faces being of a substantially plano-elliptical contour and disposed on one side of said axis and in sidewise and confronting relation with one of said headlights whereby to intercept upwardly directed light rays from said headlight and reflect the same to the eyes of the operator of said vehicle.

3. In combination, a motor vehicle having a pair of spaced headlights, and a telltale comprising a body fashioned with a substantially conical front section and a multifaced base section defining a pair of forwardly divergent reflective areas, means connecting said body to the front of said vehicle and forwardly of said headlights, said conical front section having its axis disposed in a substantially horizontal, superjacent and interjacent position with respect to said headlights and with said areas disposed one on each side of said axis and in sidewise and confronting relation to said headlights whereby to intercept light rays from said headlights and reflect the same to the eyes of the operator of said vehicle.

JOHN C. FITZGERALD.